(12) United States Patent
Kawaguchi et al.

(10) Patent No.: US 11,591,950 B2
(45) Date of Patent: Feb. 28, 2023

(54) HEAT EXCHANGING MEMBER, HEAT EXCHANGER AND HEAT EXCHANGER WITH PURIFIER

(71) Applicant: NGK INSULATORS, LTD., Nagoya (JP)

(72) Inventors: Tatsuo Kawaguchi, Nagoya (JP); Takeshi Sakuma, Nagoya (JP); Daisuke Kimura, Nagoya (JP); Yutaro Fumoto, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 43 days.

(21) Appl. No.: 16/418,227

(22) Filed: May 21, 2019

(65) Prior Publication Data

US 2019/0277570 A1 Sep. 12, 2019

Related U.S. Application Data

(63) Continuation of application No. PCT/JP2018/040911, filed on Nov. 2, 2018.

(30) Foreign Application Priority Data

Jan. 5, 2018 (JP) .............................. JP2018-000758
Jul. 13, 2018 (JP) .............................. JP2018-133563

(51) Int. Cl.
*F01P 3/14* (2006.01)
*F28D 7/16* (2006.01)
(Continued)

(52) U.S. Cl.
CPC .................. *F01P 3/14* (2013.01); *F28D 7/10* (2013.01); *F28D 7/1676* (2013.01); *F28F 1/40* (2013.01); *F28F 19/01* (2013.01); *F28F 21/04* (2013.01)

(58) Field of Classification Search
CPC .... F01P 2003/187; F28D 7/1676; F28D 7/10; F28F 1/40; F28F 1/04; F28F 19/01; F28F 21/04; F28F 21/0003; F28F 21/0014
See application file for complete search history.

(56) References Cited

U.S. PATENT DOCUMENTS 4,343,354 A * 8/1982 Weber ........................ F28F 7/02
165/165
4,353,854 A * 10/1982 Oyamada ................. B01J 35/04
264/630
(Continued)

FOREIGN PATENT DOCUMENTS

JP S57-000493 A1 1/1982
JP S60-093110 A1 5/1985
(Continued)

OTHER PUBLICATIONS

International Search Report (Application No. PCT/JP2018/040911) dated Jan. 15, 2019.
(Continued)

*Primary Examiner* — Devon Russell
(74) *Attorney, Agent, or Firm* — Burr Patent Law, PLLC

(57) ABSTRACT

A heat exchanging member including a hollow pillar shaped honeycomb structure having partition walls defining cells, the cells penetrating from a first end face to a second end face to form flow paths for a first fluid, an inner peripheral wall, and an outer peripheral wall; and a covering member being configured to cover the outer peripheral wall of the pillar shaped honeycomb structure. The heat exchanging member is configured to perform heat exchange between the first fluid and a second fluid flowing through an outer side of the covering member. In the heat exchanging member, in a cross section of the pillar shaped honeycomb structure perpendicular to a flow path direction of the first fluid, the cells are radially provided, and each of the inner peripheral
(Continued)

wall and the outer peripheral wall has a thickness larger than that of each of the partition walls.

11 Claims, 13 Drawing Sheets

(51) Int. Cl.
| | | |
|---|---|---|
| *F28F 19/01* | (2006.01) | |
| *F28F 1/40* | (2006.01) | |
| *F28D 7/10* | (2006.01) | |
| *F28F 21/04* | (2006.01) | |

(56) References Cited

U.S. PATENT DOCUMENTS

| | | | | |
|---|---|---|---|---|
| 6,178,744 | B1* | 1/2001 | Perset | F01N 3/0814 60/288 |
| 8,327,634 | B2* | 12/2012 | Orihashi | F28F 1/14 60/320 |
| 8,424,296 | B2* | 4/2013 | Burgers | F28D 9/0012 60/298 |
| 9,127,894 | B2* | 9/2015 | Limbeck | F28F 1/00 |
| 9,279,623 | B2* | 3/2016 | Limbeck | F02G 5/02 |
| 9,617,905 | B2* | 4/2017 | Seon | F28F 27/02 |
| 2002/0117773 | A1* | 8/2002 | Yamada | B28B 3/269 264/209.1 |
| 2005/0107244 | A1* | 5/2005 | Ichikawa | B01D 46/247 502/60 |
| 2005/0284623 | A1* | 12/2005 | Poole | F01N 1/006 165/242 |
| 2007/0231533 | A1* | 10/2007 | Aniolek | C04B 35/185 428/116 |
| 2009/0049832 | A1* | 2/2009 | Hase | F01N 5/02 60/320 |
| 2010/0146954 | A1* | 6/2010 | Sloss | F02D 9/04 60/320 |
| 2012/0017575 | A1* | 1/2012 | Sloss | F01N 5/02 60/320 |
| 2012/0247732 | A1* | 10/2012 | Suzuki | F28F 21/04 165/104.14 |
| 2012/0297754 | A1* | 11/2012 | Hisanaga | F01N 5/02 60/320 |
| 2013/0213620 | A1* | 8/2013 | Miyazaki | F28F 21/04 165/154 |
| 2013/0248159 | A1* | 9/2013 | Yoshida | C04B 35/565 165/154 |
| 2014/0020877 | A1* | 1/2014 | Suzuki | F01N 3/2889 165/181 |
| 2014/0102683 | A1* | 4/2014 | Kawaguchi | F28F 21/04 165/165 |
| 2014/0352286 | A1* | 12/2014 | Kato | F28D 9/0012 60/320 |
| 2015/0292812 | A1* | 10/2015 | Tomita | F28F 13/12 165/177 |
| 2016/0003550 | A1* | 1/2016 | Tokuda | F28D 7/103 165/140 |
| 2016/0341489 | A1* | 11/2016 | Ichiyanagi | F28D 7/005 |
| 2018/0230884 | A1 | 8/2018 | Kawaguchi et al. | |

FOREIGN PATENT DOCUMENTS

| | | | | |
|---|---|---|---|---|
| JP | 02102004 | A * | 4/1990 | ............ B28B 3/269 |
| JP | H02-102004 | A1 | 4/1990 | |
| JP | H08-068318 | A1 | 3/1996 | |
| JP | 2002-321210 | A1 | 11/2002 | |
| JP | 2006-250524 | A1 | 9/2006 | |
| JP | 2008-292017 | A1 | 12/2008 | |
| JP | 2009-532605 | A1 | 9/2009 | |
| JP | 4567338 | B2 | 10/2010 | |
| JP | 2016-056752 | A1 | 4/2016 | |
| JP | 6075381 | B2 | 2/2017 | |
| WO | 2017/069265 | A1 | 4/2017 | |

OTHER PUBLICATIONS

English translation of the International Preliminary Report on Patentability (Chapter I) (Application No. PCT/JP2018/040911) dated Jul. 16, 2020.

* cited by examiner

HEAT EXCHANGING MEMBER, HEAT EXCHANGER AND HEAT EXCHANGER WITH PURIFIER

CROSS REFERENCE TO RELATED APPLICATIONS

This application is a continuation application of International Application No. PCT/JP2018/040911 filed Nov. 2, 2018, which designated the United States, and claims the benefit under 35 USC § 119(a)-(d) of Japanese Application No. 2018-000758 filed Jan. 5, 2018 and Japanese Application No. 2018-133563 filed Jul. 13, 2018, the entireties of which are incorporated herein by reference.

FIELD OF THE INVENTION

The present invention relates to a heat exchanging member, a heat exchanger and a heat exchanger with purifier. More particularly, the present invention relates to a heat exchanging member for transmitting heat of a first fluid (on a high temperature side) to a second fluid (a low temperature side), as well as a heat exchanger including the heat exchanging member, and a heat exchanger with purifier.

BACKGROUND OF THE INVENTION

Recently, there is a need for improvement of fuel economy of motor vehicles. In particular, a system is expected that worms up a coolant, engine oil and ATF (Automatic Transmission Fluid) at an early stage to reduce friction losses, in order to prevent deterioration of fuel economy at the time when an engine is cold, such as when the engine is started. Further, a system is expected that heats an exhaust gas purifying catalyst in order to activate the catalyst at an early stage.

In such systems, for example, the use of a heat exchanger is considered. The heat exchanger is an apparatus including a heat exchanging member for conducting heat exchange between a first fluid and a second fluid by allowing the first fluid to flow inside and the second fluid to flow outside. In such a heat exchanger, for example, the heat can be effectively utilized by exchanging the heat from the first fluid having a high temperature (for example, an exhaust gas) to the second fluid having a low temperature (for example, cooling water).

As a heat exchanger for recovering heat from a gas with elevated temperature such as a motor vehicle exhaust gas, a heat exchanger having a heat exchanging member made of a refractory metal has been known. However, there have been problems that the refractory metal is expensive and further difficult to be processed, has high density and heavy weight, and has lower thermal conductivity, and the like. In view of the problems, recently, a heat exchanger is being developed that houses a heat exchanging member having a pillar shaped honeycomb structure in a frame (a casing), and allows a first fluid to flow through cells of the honeycomb structure, and a second fluid to flow on an outer peripheral surface of the heat exchanging member in the casing.

As heat exchanging member having a honeycomb structure, the prior art proposes a heat exchanger having a pillar shaped honeycomb structure including: first partition walls each extending in a radial direction from a central portion toward an outer peripheral portion; and second partition walls each extending in a circumferential direction, in a cross section perpendicular to a flow path direction of a first fluid (a cell extending direction) (Patent Document 1).

Further, the prior art proposes a heat exchanging member having a hollow (donut type) pillar shaped honeycomb structure provided with a hollow region that acts as a bypass path for an exhaust gas (Patent Document 2).

CITATION LIST

Patent Literatures

Patent Document 1: Japanese Patent No. 6075381 B2
Patent Document 2: WO 2017/069265 A1

SUMMARY OF THE INVENTION

An outer peripheral wall of a pillar shaped honeycomb structure used for a heat exchanging member is subjected to external impact, thermal stress due to a temperature difference between a first fluid and a second fluid, or the like. Therefore, there is a problem that the outer peripheral wall is easily broken by the external force. Further, the hollow pillar shaped honeycomb structure causes a problem that, in addition to the outer peripheral wall, an inner peripheral wall is easily broken by compression or expansion due to the external force.

However, Patent Documents 1 and 2 do not sufficiently study the problems caused by the external force for the heat exchanging member having the pillar shaped honeycomb structure.

The present invention has been made to solve the above problems. An object of the present invention is to provide a heat exchanging member, a heat exchanger, and a heat exchanger with purifier, which have improved resistance against the external impact, thermal stress and the like.

As a result of intensive studies to solve the above problems, the present inventors found that, in a hollow pillar shaped honeycomb structure including partition walls defining cells, an inner peripheral wall and an outer peripheral wall, a thickness of each of the inner peripheral wall and the outer peripheral wall is increased as compared with a thickness of each partition wall, thereby improving resistance against the external force, and have completed the present invention.

Thus, the present invention relates to a heat exchanging member comprising:

a hollow pillar shaped honeycomb structure having partition walls defining cells, the cells penetrating from a first end face to a second end face to form flow paths for a first fluid, an inner peripheral wall, and an outer peripheral wall; and a covering member being configured to cover the outer peripheral wall of the pillar shaped honeycomb structure, the heat exchanging member being configured to perform heat exchange between the first fluid and a second fluid flowing through an outer side of the covering member, wherein in a cross section of the pillar shaped honeycomb structure perpendicular to a flow path direction of the first fluid, the cells are radially provided, and wherein each of the inner peripheral wall and the outer peripheral wall has a thickness larger than that of each of the partition walls.

The present invention also relates to a heat exchanger comprising the heat exchanging member.

The present invention also relates to a heat exchanger, comprising:

the heat exchanging member;

an inner cylinder provided in a hollow region of the hollow pillar shaped honeycomb structure, the inner cylinder having through holes for introducing the first fluid into the cells of the hollow honeycomb structure;

a frame being configured to form a flow path for the second fluid, the flow path being defined between the frame and the covering member; and an on-off valve being configured to interrupt a flow of the first fluid on an inner side of the inner cylinder during heat exchange between the first fluid and the second fluid.

The present invention also relates to a heat exchanger with at least one purifier, comprising:

the heat exchanger; and at least one purifier provided in the flow path for the first fluid on an upstream side and/or a downstream side of the heat exchanger, wherein the at least one purifier and the heat exchanger are integrated by the frame of the heat exchanger.

The present invention also relates to a heat exchanger with at least one purifier, comprising:

two or more heat exchangers; and at least one purifier provided in the flow path for the first fluid between the heat exchangers, wherein the at least one purifier and the heat exchangers are integrated by the frame of the heat exchanger, and at least one of the two or more heat exchangers is the heat exchanger as described above.

According to the present invention, it is possible to provide a heat exchanging member, a heat exchanger, and a heat exchanger with purifier, which have improved resistance against external impact, thermal stress and the like.

DETAILED DESCRIPTION OF THE INVENTION

Hereinafter, embodiments of the present invention will be specifically described with reference to the drawings. It is to understand that the present invention is not limited to the following embodiments, and those which appropriately added changes, improvements and the like to the following embodiments based on knowledge of a person skilled in the art without departing from the spirit of the present invention fall within the scope of the present invention.

Embodiment 1

Heat Exchanging Member

Figure 1:
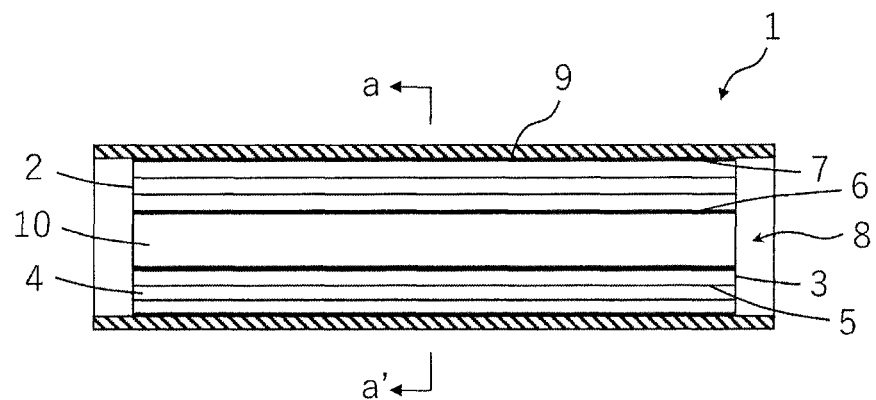
FIG. 1 is a cross-sectional view of a hollow pillar shaped honeycomb structure in a direction parallel to a flow path direction of a first fluid in a heat exchanging member according to Embodiment 1 of the present invention.
Figure 2:
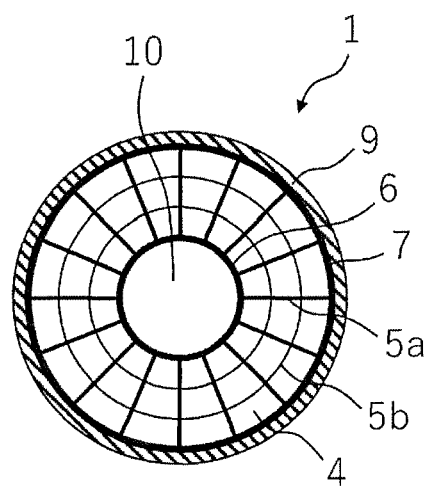
FIG. 2 is a cross-sectional view of a hollow pillar shaped honeycomb structure in a direction perpendicular to a flow path direction of a first fluid (a cross-sectional view taken along the line a-a' in FIG. 1), in a heat exchanging member according to Embodiment 1 of the present invention.

FIG. 1 shows a cross-sectional view of a hollow pillar shaped honeycomb structure in a direction parallel to a flow path direction of a first fluid (an extending direction of cells), for a heat exchanging member according to Embodiment 1 of the present invention. FIG. 2 shows a cross-sectional view taken along the line a-a' in FIG. 1, which illustrates a cross-sectional view of the hollow pillar shaped honeycomb structure in a direction perpendicular to the flow path direction of the first fluid, for the heat exchanging member according to Embodiment 1 of the present invention.

A heat exchanging member 1 includes: a hollow pillar shaped honeycomb structure 8 having partition walls 5, an inner peripheral wall 6 and an outer peripheral wall 7, the partition walls defining cells 4 that penetrate from a first end face 2 to a second end face 3 to form flow paths for a first fluid; and a covering member 9 being configured to cover the outer peripheral wall 7 of the hollow pillar shaped honeycomb structure 8. In the heat exchanging member 1, heat exchange between the first fluid and a second fluid flowing through an outer side of the covering member 9 is performed via the outer peripheral wall 7 of the pillar shaped honeycomb structure 8 and the covering member 9. It should be noted that in FIG. 1, the first fluid can flow in both right and left directions on a page surface of FIG. 1. The first fluid is not particularly limited, and various liquids or gases may be used. For example, when the heat exchanging member 1 is used for a heat exchanger mounted on a motor vehicle, the first fluid is preferably an exhaust gas.

As used herein, the "hollow pillar shaped honeycomb structure 8" refers to a hollow pillar shaped honeycomb structure having a hollow region 10 at a central portion in a cross section (the cross section in FIG. 2) perpendicular to a flow path direction of the first fluid.

A shape (an outer shape) of the hollow pillar shaped honeycomb structure 8 may be, but not limited to, for example, a circular pillar shape, an elliptic pillar shape, a quadrangular pillar shape or other polygonal pillar shape. Thus, the outer shape of the hollow pillar shaped honeycomb structure 8 in the cross section in FIG. 2 may be circular, elliptical, quadrangular or other polygonal.

Also, a shape of the hollow region 10 of the hollow pillar shaped honeycomb structure 8 may be, but not limited to, for example, a circular pillar shape, an elliptic pillar shape, a quadrangular pillar shape or other polygonal pillar shape. Thus, the shape of the hollow region 10 in the cross section in FIG. 2 may be circular, elliptical, quadrangular or other polygonal.

Although the shapes of the hollow pillar shaped honeycomb structure 8 and the hollow region 10 may be the same as or different from each other, it is preferable that they are the same as each other, in terms of resistance against external impact, thermal stress and the like.

The cells 4 are radially provided in a cross section (the cross section in FIG. 2) in a direction perpendicular to the flow path direction of the first fluid. Such a structure can allow heat of the first fluid flowing through the cells 4 to be efficiently transmitted to the outside of the hollow pillar shaped honeycomb structure 8.

Figures 3A, 3B, 3C:
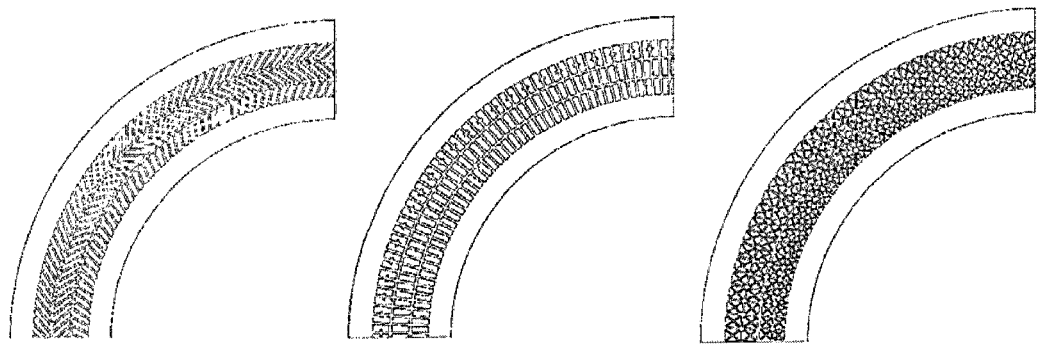
FIGS. 3A-3C are partially enlarged views for explaining shapes of cells in a cross section of a hollow pillar shaped honeycomb structure in a direction perpendicular to a flow path direction of a first fluid.

Each cell 4 may have any shape, including, but not particularly limited to, circular, elliptical, triangular, quadrangular, hexagonal and other polygonal shapes in a cross section in a direction perpendicular to the flow path direction of the first fluid. More particularly, in addition to the shape shown in FIG. 2, the cells 4 may have various shapes as shown in FIG. 3A to FIG. 3C.

Each of the inner peripheral wall 6 and the outer peripheral wall 7 has a thickness larger than that of the partition wall 5. Such a structure can lead to increased strength of the inner peripheral wall 6 and the outer peripheral wall 7 which would otherwise tend to generate breakage (e.g., cracking, chinking, and the like) by external impact, thermal stress due to a temperature difference between the first fluid and the second fluid, and the like.

The thicknesses of the inner peripheral wall 6 and the outer peripheral wall 7 are not particularly limited, and may be appropriately adjusted according to applications and the like. For example, the thickness of each of the inner peripheral wall 6 and the outer peripheral wall 7 is preferably more than 0.3 mm and 10 mm or less when using the heat exchanging member 1 for general heat exchange applications, and more preferably from 0.5 mm to 5 mm, and even more preferably from 1 mm to 3 mm. Moreover, when using the heat exchanging member 1 for a thermal storage application, the thickness of the outer peripheral wall 7 is preferably 10 mm or more, in order to increase a heat capacity of the outer peripheral wall 7.

Partition walls 5 preferably include second partition walls 5b extending in the circumferential direction and first partition walls 5a crossing with the second partition walls 5b, in a cross section perpendicular to the flow path direction of the first fluid. With such an arrangement, the heat of the first fluid flowing through the cells 4 can be efficiently transmitted to the outside of the hollow pillar shaped honeycomb structure 8 while ensuring the strength of the hollow pillar shaped honeycomb structure 8.

Further, the first partition walls 5a preferably extend in a radial direction. Such a structure can allow improvement of thermal conductivity in the radial direction, so that the heat of the first fluid flowing through the cells 4 can be efficiently transmitted to the outside of the hollow pillar shaped honeycomb structure 8.

In the cross section perpendicular to the flow path direction of the first fluid, a length of the first partition walls 5a defining one cell 4 is preferably longer than that of the second partition walls 5b defining one cell 4. The first partition walls 5a contribute to thermal conductivity in the radiation direction. Therefore, with such an arrangement, the heat of the first fluid flowing through the cells 4 can be efficiently transmitted to the outside of the hollow pillar shaped honeycomb structure 8.

Each first partition wall 5a preferably has a thickness greater than that of each second partition wall 5b. The thickness of each partition wall 5 correlates with the thermal conductivity. Therefore, such a configuration can lead to larger thermal conductivity of the first partition wall 5a than the thermal conductivity of the second partition wall 5b. As a result, the heat of the first fluid flowing through the cells 4 can be effectively transmitted to the outside of the hollow pillar shaped honeycomb structure 8.

In addition, the thickness of the partition wall 5 (the first partition wall 5a and the second partition wall 5b) is not particularly limited, and it may be adjusted as needed depending on applications and the like. The thickness of the partition wall 5 may preferably be from 0.1 to 1 mm, and more preferably from 0.2 to 0.6 mm. The thickness of the partition wall 5 of 0.1 mm or more can provide the hollow pillar shaped honeycomb structure 8 with a sufficient mechanical strength. Further, the thickness of the partition wall 5 of 1 mm or less can prevent problems that the pressure loss is increased due to a decrease in an opening area and the heat recovery efficiency is decreased due to a decrease in a contact area with the first fluid.

When the first partition walls 5a extend in the radial direction, a space between the adjacent first partition walls 5a will be narrower toward the inner peripheral wall 6 side, which may result in difficult formation of the cells 4. Further, when the cells 4 are not formed on the inner peripheral wall 6 side, or when the cross-sectional areas of the cells 4 formed on the inner peripheral wall 6 side are too low, the pressure loss of the heat exchanging member 1 will be increased. From viewpoint of prevention of such problems, in the cross section of hollow pillar shaped honeycomb structure 8 perpendicular to the flow path direction of the first fluid, a number of the partition walls 5a on the inner peripheral wall 6 side of the hollow pillar shaped honeycomb structure 8 is less than a number of the first partition walls 5a on the outer peripheral wall 7 side of the hollow pillar shaped honeycomb structure 8. With such a configuration, the cells 4 can be stably formed even on the inner peripheral wall 6 side. It is, therefore, possible to suppress an increase in a pressure loss of the heat exchanging member 1, which is caused by difficulty in forming the cells 4 on the inner peripheral wall 6 side.

Here, the number of the first partition walls 5a on the inner peripheral wall 6 side of the hollow pillar shaped honeycomb structure 8 means the total number of the first partition walls 5a forming a plurality of cells 4 in a region having a plurality of cells 4 aligned in the circumferential direction (hereinafter referred to as a "circumferential region"), which region is closest to the hollow region 10 of the hollow pillar shaped honeycomb structure 8 (that is, furthest from the outer peripheral wall 7), in the cross section shown in FIG. 2. Further, the number of the first partition walls 5a on the outer peripheral wall 7 side of the hollow pillar shaped honeycomb structure 8 means the total number of the first partition walls 5a forming a plurality of cells 4 in the circumferential region which is farthest from the hollow region 10 of the hollow pillar shaped honeycomb structure 7 (that is, closest to the outer peripheral wall 7), in the cross section shown in FIG. 2.

In the cross section of the hollow pillar shaped honeycomb structure 8 perpendicular to the flow path direction of the first fluid, the number of the first partition walls 5a on the inner peripheral wall 6 side is preferably decreased from the outer peripheral wall 7 side toward the inner peripheral wall 6 side. A space between the adjacent first partition walls 5a becomes narrower toward the inner peripheral wall 6 side, which otherwise will be difficult to form the cells 4. However, with that configuration, the space between the adjacent first partition walls 5a can be maintained, so that the cells 4 can be stably formed. Thus, an increase in a pressure loss of the heat exchanging member 1 can be suppressed.

It should be noted that a frequency of a decrease in the number of the first partition walls 5a is not particularly limited, and it may be continuous or intermittent.

The partition wall 5 may preferably have a density of from 0.5 to 5 g/cm$^3$. The density of the partition wall 5 of 0.5 g/cm$^3$ or more can provide the partition wall 5 with a sufficient strength. Further, the density of the partition wall 5 of 5 g/cm$^3$ or less can allow weight reduction of the hollow pillar shaped honeycomb structure 8. The density within the above range can allow the hollow pillar shaped honeycomb structure 8 to be strengthened and can also provide an effect of improving the thermal conductivity. It should be noted that the density of the partition wall 5 is a value measured by the Archimedes method.

The partition walls 5 and the outer peripheral wall 7 of the pillar shaped honeycomb structure 8 are mainly based on ceramics. The phrase "mainly based on ceramics" means that a ratio of a mass of ceramics to the total mass of the partition walls 5, the inner peripheral wall 6 and the outer peripheral wall 7 is 50% by mass or more.

Each of the partition walls 5, the inner peripheral wall 6 and the outer peripheral wall 7 preferably has a porosity of 10% or less, and more preferably 5% or less, and even more preferably 3% or less. Further, the porosity of the partition walls 5, the inner peripheral wall 6 and the outer peripheral wall 7 may be 0%. The porosity of the partition walls 5, the inner peripheral wall 6 and the outer peripheral wall 7 of 10% or less can lead to improvement of thermal conductivity.

The partition walls 5, the inner peripheral wall 6 and the outer peripheral wall 7 preferably contain SiC (silicon carbide) having high thermal conductivity as a main component. The phrase "contain SiC (silicon carbide) as a main component" means that a ratio of a mass of SiC (silicon carbide) to the total mass of the partition walls 5, the inner peripheral wall 6 and the outer peripheral wall 7 is 50% by mass or more.

More particularly, the material of the hollow pillar shaped honeycomb structure 8 that can be used includes Si-impregnated SiC, (Si+Al) impregnated SiC, metal composite SiC, recrystallized SiC, Si$_3$N$_4$, SiC, and the like. Among them, Si-impregnated SiC and (Si+Al) impregnated SiC are preferably used because they can allow production at lower cost and have high thermal conductivity.

A cell density (that is, the number of cells 4 per unit area) in the cross section of the hollow pillar shaped honeycomb structure 8 perpendicular to the flow path direction of the first fluid is not particularly limited, and it may be adjusted as needed depending on applications or the like, and preferably in a range of from 4 to 320 cells/cm$^2$. The cell density of 4 cells/cm$^2$ or more can sufficiently ensure the strength of the partition walls 5, hence the strength of the hollow pillar shaped honeycomb structure 8 itself and effective GSA (geometrical surface area). Further, the cell density of 320 cells/cm$^2$ or less can allow prevention of an increase in a pressure loss when the first fluid flows.

The hollow pillar shaped honeycomb structure 8 preferably has an isostatic strength of more than 100 MPa, and more preferably 150 MPa or more, and still more preferably 200 MPa or more. The isostatic strength of the hollow pillar shaped honeycomb structure 8 of more than 100 MPa can lead to the hollow pillar shaped honeycomb structure 8 having improved durability. The isostatic strength of the hollow pillar shaped honeycomb structure 8 can be measured according to the method for measuring isostatic fracture strength as defied in the JASO standard M505-87 which is a motor vehicle standard issued by Society of Automotive Engineers of Japan, Inc.

A diameter (an outer diameter) of the outer peripheral wall 7 in the cross section in direction perpendicular to the flow path direction of the first fluid may preferably be from 20 to 200 mm, and more preferably from 30 to 100 mm. Such a diameter can allow improvement of heat recovery efficiency. When the shape of the outer peripheral wall 7 is not circular, the diameter of the largest inscribed circle that is inscribed in the cross-sectional shape of the outer peripheral wall 7 is defined as the diameter of the outer peripheral wall 7.

Further, a diameter of the inner peripheral wall 6 in the cross section in the direction perpendicular to the flow path direction of the first fluid is preferably from 1 to 50 mm, and more preferably from 2 to 30 mm. When the cross-sectional shape of the inner peripheral wall 6 is not circular, the diameter of the largest inscribed circle that is inscribed in the cross-sectional shape of the inner peripheral wall 6 is defined as the diameter of the inner peripheral wall 6.

The hollow pillar shaped honeycomb structure 8 preferably has a thermal conductivity of 50 W/(m·K) or more at 25° C., and more preferably from 100 to 300 W/(m·K), and even more preferably from 120 to 300 W/(m·K). The thermal conductivity of the hollow pillar shaped honeycomb structure 8 in such a range can lead to an improved thermal conductivity and can allow the heat inside the hollow pillar shaped honeycomb structure 8 to be efficiently transmitted to the outside. It should be noted that the value of thermal conductivity is a value measured according to the laser flash method (JIS R 1611-1997).

In the case where an exhaust gas as the first fluid flows through the cells 4 in the hollow pillar shaped honeycomb structure 8, a catalyst is preferably supported on the partition walls 5 of the pillar shaped honeycomb structure 8. The supporting of the catalyst on the partition walls 5 can allow CO, NOx, HC and the like in the exhaust gas to be converted into harmless substances through catalytic reaction, and can also allow reaction heat generated during the catalytic reaction to be utilized for heat exchange. Preferable catalysts include those containing at least one element selected from the group consisting of noble metals (platinum, rhodium, palladium, ruthenium, indium, silver and gold), aluminum, nickel, zirconium, titanium, cerium, cobalt, manganese, zinc, copper, tin, iron, niobium, magnesium, lanthanum, samarium, bismuth, and barium. Any of the above-listed elements may be contained as a metal simple substance, a metal oxide, or other metal compound.

A supported amount of the catalyst (catalyst metal+support) may preferably be from 10 to 400 g/L. Further, in the case of a catalyst containing a noble metal(s), the supported amount may preferably be from 0.1 to 5 g/L. The supported amount of the catalyst (catalyst metal+support) of 10 g/L or more can easily achieve catalysis. On the other hand, the supported amount of 400 g/L or less can allow suppression of both an increase in a pressure loss and an increase in a manufacturing cost. The support refers to a carrier on which a catalyst metal is supported. Preferable supports include those containing at least one selected from the group consisting of alumina, ceria and zirconia.

The covering member 9 is not particularly limited as long as it can cover the outer peripheral wall 7 of the hollow pillar shaped honeycomb structure 8. For example, it is possible to use a cylindrical member that is fitted into the outer peripheral wall 7 of the hollow pillar shaped honeycomb structure 8 to cover circumferentially the outer peripheral wall 7 of the hollow pillar shaped honeycomb structure 8.

As used herein, the "fitted" means that the hollow pillar shaped honeycomb structure 8 and the covering member 9 are fixed in a state of being suited to each other. Therefore, the fitting of the hollow pillar shaped honeycomb structure 8 and the covering member 9 encompasses cases where the hollow pillar shaped honeycomb structure 8 and the covering member 9 are fixed to each other by a fixing method based on fitting such as clearance fitting, interference fitting and shrinkage fitting, as well as by brazing, welding, diffusion bonding, or the like.

The covering member 9 can have an inner surface shape corresponding to the outer peripheral wall 7 of the hollow pillar shaped honeycomb structure 8. Since the inner surface of the covering member 9 is in direct contact with the outer peripheral wall 7 of the hollow pillar shaped honeycomb structure 8, the thermal conductivity is improved and the heat in the hollow pillar shaped honeycomb structure 8 can be efficiently transferred to the covering member 9.

In terms of improvement of the heat recovery efficiency, a higher ratio of an area of a portion circumferentially covered with the covering member 9 in the outer peripheral wall 7 of the hollow pillar shaped honeycomb structure 8 to the total area of the outer peripheral wall 7 of the hollow pillar shaped honeycomb structure 8 is preferable. Specifically, the area ratio is preferably 80% or more, and more preferably 90% or more, and even more preferably 100% (that is, the entire outer peripheral wall 7 of the hollow pillar shaped honeycomb structure 8 is circumferentially covered with the covering member 9).

It should be noted that the term "outer peripheral wall 7" as used herein refers to a surface of the pillar shaped honeycomb structure 8, parallel to the flow path direction of the first fluid, and does not include surfaces (the first end face 2 and the second end face 3) of the pillar shaped honeycomb structure 8, which are perpendicular to the flow path direction of the first fluid.

The covering member 9 is preferably made of a metal in terms of manufacturability. Further, the metallic covering member 9 is also preferable in that it can be easily welded to a metallic frame (casing) 32 that will be described below. Examples of the material of the covering member 9 that can be used include stainless steel, titanium alloys, copper alloys, aluminum alloys, brass and the like. Among them, the stainless steel is preferable because it has high durability and reliability and is inexpensive.

The covering member 9 preferably has a thickness of 0.1 mm or more, and more preferably 0.3 mm or more, and still more preferably 0.5 mm or more, for the reason of durability and reliability. The thickness of the covering member 9 is preferably 10 mm or less, and more preferably 5 mm or less, and still more preferably 3 mm or less, for the reason of reducing thermal resistance and improving thermal conductivity.

Heat Exchanger

The heat exchanger according to the present invention includes the heat exchanging member 1 as described above. Members other than the heat exchanging member 1 are not particularly limited, and known members may be used.

Methods for Producing Heat Exchanging Member and Heat Exchanger

Methods for producing the heat exchanging member and the heat exchanger according to Embodiment 1 are not particularly limited, and may be carried out in accordance with known methods. For example, these methods can be carried out in accordance with producing methods as described below.

First, a green body containing ceramic powder is extruded into a desired shape to prepare a honeycomb formed body. At this time, the shape and density of the cells 4, the number, lengths and thicknesses of the partition walls 5, the shapes and the thicknesses of the inner peripheral wall 6 and the outer peripheral wall 7, and the like, can be controlled by selecting dies and jigs in appropriate forms. The material of the honeycomb formed body that can be used includes the ceramics as described above. For example, when producing a honeycomb formed body mainly based on a Si-impregnated SiC composite, a binder and water or an organic solvent are added to a predetermined amount of SiC powder, and the resulting mixture is kneaded to form a green body, which can be then formed into a honeycomb formed body having a desired shape. The resulting honeycomb formed body can be then dried, and the honeycomb formed body can be impregnated with metallic Si and fired under reduced pressure in an inert gas or vacuum to obtain a hollow pillar shaped honeycomb structure 8 having cells 4 defined by partition walls 5.

The hollow pillar shaped honeycomb structure 8 is then inserted into the covering member 9, whereby the outer peripheral surface of the hollow pillar shaped honeycomb structure 8 is circumferentially covered with the covering member 9. By shrinkage-fitting them in this state, the inner peripheral surface of the covering member 9 is fitted into the outer peripheral surface of the hollow pillar shaped honeycomb structure 8. As described above, the fitting of the hollow pillar shaped honeycomb structure 8 and the covering member 9 can be performed by, in addition to the shrinkage fitting, a fixing method based on fitting such as clearance fitting and interference fitting, or by brazing, welding, diffusion bonding or the like. Thus, the heat exchanging member 1 is completed.

The heat exchanging member 1 can be combined with other members and subjected to processing such as bonding to obtain a heat exchanger 20.

Embodiment 2

Figure 4:
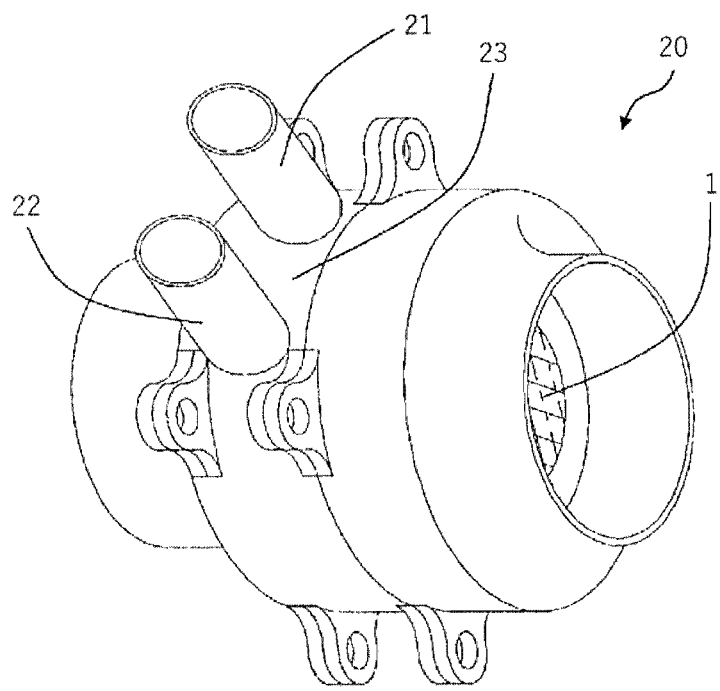
FIG. 4 is a perspective view of a heat exchanger according to Embodiment 2 of the present invention.

FIG. 4 shows a perspective view of a heat exchanger according to Embodiment 2 of the present invention. Further, FIG. 5 shows a cross-sectional view of the hollow pillar shaped honeycomb structure in a direction parallel to the flow path direction of the first fluid.

Figure 5:
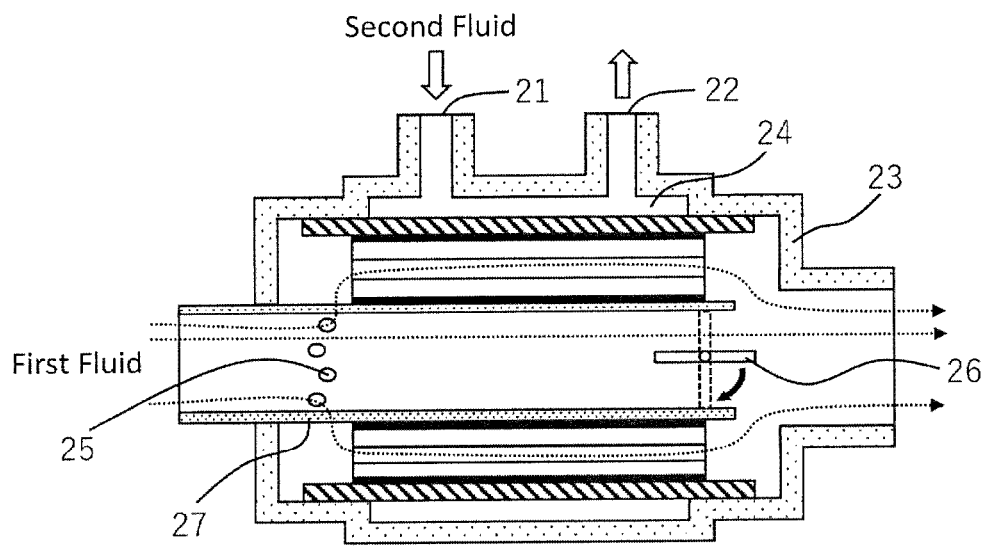
FIG. 5 is a cross-sectional view of a hollow pillar shaped honeycomb structure in a direction parallel to a flow path direction of a first fluid in a heat exchanger according to Embodiment 2 of the present invention.
Figures 6A, 6B, 6C:
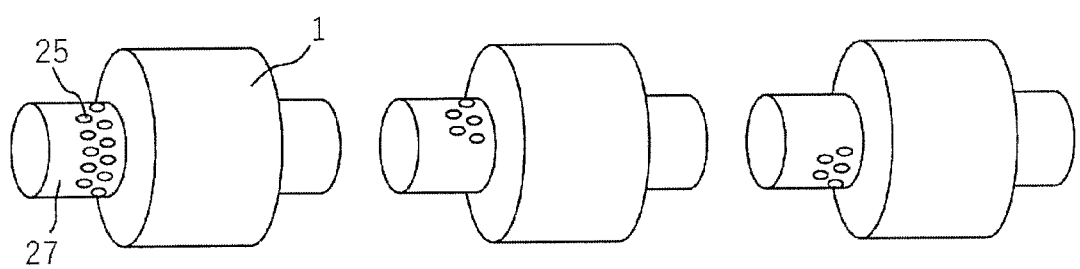
FIGS. 6A-6F are enlarged perspective views of a portion of each of heat exchanging members and inner cylinders of frames.
Figures 6D, 6E, 6F:
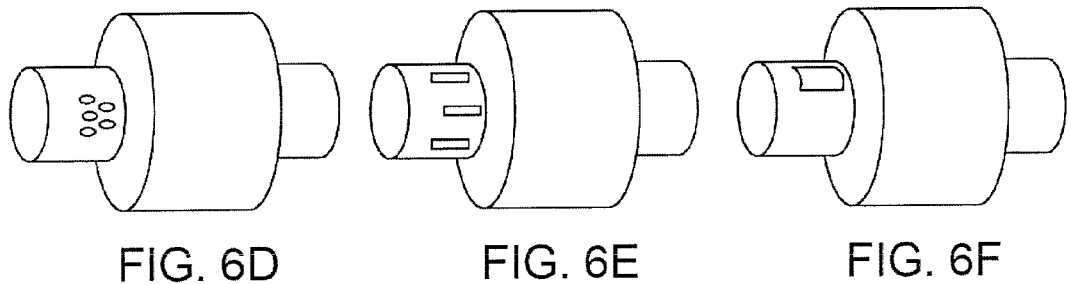

As shown in FIG. 5, the heat exchanger 20 includes: the heat exchanging member 1 as described above; an inner cylinder 27 provided in the hollow region 10 of the hollow pillar shaped honeycomb structure 8; a frame 23 being configured to form a flow path 24 for the second fluid between the frame 23 and the covering member 9; and an on-off valve 26 provided at the inner cylinder 27.

The inner cylinder 27 has through holes 25 being configured to introduce the first fluid into the cells 4 of the hollow honeycomb structure 8. The through holes 25 allow the flow of the first fluid to be branched into two flows (the cells 4 and the hollow region 10 of the hollow pillar shaped honeycomb structure 8).

The frame 23 further includes an inlet 21 for the second fluid and an outlet 22 for the second fluid, and circumferentially covers the covering member 9. Preferably, the frame 23 circumferentially covers the entire heat exchanging member 1 in terms of improving the heat exchange efficiency.

The on-off valve 26 can control an amount of the first fluid flowing through the hollow region 10 of the hollow pillar shaped honeycomb structure 8 by the opening and closing mechanism. In particular, the on-off valve 26 blocks the flow of the first fluid on the inner side of the inner cylinder 27 during heat exchange between the first fluid and the second fluid, thereby enabling the first fluid to be selectively introduced into the cells 4 of the hollow honeycomb structure 8 via the through holes 25. Therefore, the heat exchange between the first fluid and the second fluid can be efficiently performed.

Here, examples of the through holes 25 provided at the inner cylinder 27 are shown in FIGS. 6A-6F. FIGS. 6A-6F are partially enlarged perspective views showing a portion of the heat exchanging member 1 (however, the covering member 9 is omitted) and the inner cylinder 27. As shown in FIGS. 6A to 6F, the through holes 25 may be formed on the entire periphery of the inner cylinder 27, or on a partial position of the inner cylinder 27 (e.g., only on an upper portion, a central portion or a lower portion). Each through hole 25 can also have various shapes such as a circle, an ellipse, and a quadrangle.

In the heat exchanger 20, the second fluid flows into the frame 23 from the inlet 21 for the second fluid. The second fluid is then subjected to heat exchange to the first fluid flowing through the cells 4 of the hollow pillar shaped honeycomb structure 8 via the covering member 9 of the heat exchanging member 1, while passing through the flow path 24 for the second fluid, and the second fluid then flows out from the outlet 22 for the second fluid. It should be noted that the outer peripheral surface of the covering member 9 of the heat exchanging member 1 may be covered with a member being configured to adjust a heat transfer efficiency.

On one hand, the first fluid flows into the inside of the inner cylinder 27. At this time, when the on-off valve 26 is closed, ventilation resistance of the inner cylinder 27 in the hollow region 10 is increased, so that the first fluid selectively flows into the cells 4 via the through holes 25. On the other hand, when the on-off valve 26 is opened, the ventilation resistance of the inner cylinder 27 in the hollow region 10 is decreased, so that the first fluid selectively flows into the inner cylinder 27 in the hollow region 10. Therefore, by controlling the opening and closing of the on-off valve 26, an amount of the first fluid flowing into the cells 4 can be adjusted. In addition, since the first fluid flowing through the inner cylinder 27 in the hollow region 10 has a little contribution to heat exchange to the second fluid, the path for the first fluid serves as a bypass route in the case where the heat recovery of the first fluid is intended to be suppressed, and the like. That is, when it is desired to suppress the heat recovery of the first fluid, the on-off valve 26 may be opened.

The material of the frame 23 is not particularly limited, and it may preferably be a metal in terms of thermal conductivity and manufacturability. Examples of the metal that can be used include stainless steel, titanium alloys, copper alloys, aluminum alloys, brass, and the like. Among them, the stainless steel is preferable because it is inexpensive and has high durability and reliability.

The thickness of the frame 23 is not particularly limited, and it may preferably be 0.1 mm or more, and more preferably 0.5 mm or more, and still more preferably 1 mm or more, for the reasons of durability and reliability. The thickness of the frame 23 is preferably 10 mm or less, and more preferably 5 mm or less, and still more preferably 3 mm or less, in terms of cost, volume, weight and the like.

The frame 23 may be an integrally formed product, but it may preferably be a joined member formed of two or more members. In the case where the frame 23 is the joined member formed of two or more members, freedom in design for the frame 23 can be improved.

The shape and structure of the on-off valve 26 are not particularly limited, and appropriate shape and structure may be selected depending on the hollow region 10 of the hollow pillar shaped honeycomb structure 8 in which the on-off valve 26 is provided.

The second fluid is not particularly limited, but the second fluid is preferably water or an antifreezing solution (LLC defined in JIS K 2234: 2006) when the heat exchanger 20 is mounted on a motor vehicle. For the temperatures of the first fluid and the second fluid, the temperature of the first fluid is preferably higher than the temperature of the second fluid, because under the temperature condition, the covering member 9 of the heat exchanging member 1 does not expand at the lower temperature and the hollow pillar shaped honeycomb structure 8 expands at the higher temperature, so that the fitted two members are difficult to be loosened. In particular, when the fitting of the hollow pillar shaped honeycomb structure 8 and the covering member 9 is shrinkage fitting, the above temperature condition can minimize a risk that the fitted members are loosened and the pillar shaped honeycomb structure 8 is fallen out.

In the heat exchanger 20, the second fluid inlet 21 is provided on the same side as the outlet 22 for the second fluid. However, there is no limitation for the positions of the inlet 21 for the second fluid and the outlet 22 for the second fluid, and the positions may be changed as needed, in view of the installation position of the heat exchanger 20, the piping position, and the heat exchange efficiency.

Further, FIG. 5 shows the case where the first fluid and the second fluid flow in parallel in the same direction in the axial direction (the extending direction of the cells 4) of the hollow pillar shaped honeycomb structure 8. However, the inlet 21 and the outlet 22 for the second fluid may be reversed, so that the first fluid and the second fluid may flow in the direction opposite to the axial direction of the hollow pillar shaped honeycomb structure 8. With such a configuration, the heat exchange efficiency can be improved because the heat exchange can be performed to the first fluid having a higher temperature as the second fluid goes downstream.

The heat exchanging member 1 having the above features can be combined with the frame 23 and the inner cylinder 27 and subjected to processing such as bonding to produce the heat exchanger 20.

Embodiment 3

A heat exchanger according to Embodiment 3 of the present invention is different from the heat exchanger according to Embodiment 2 of the present invention in that in the former, the on-off valve 26 is configured to interrupt the flow of the first fluid on the cell 4 side of the hollow honeycomb structure 8 during non-heat exchange. Hereinafter, descriptions of the same portions as those of the heat exchanger according to Embodiment 2 of the present invention will be omitted, and only different points will be described.

In the heat exchanger according to Embodiment 2 of the present invention, when it is desired to suppress the heat recovery of the first fluid, the on-off valve 26 is opened to allow more easily flowing of the first fluid to the inner cylinder 7 side than the cell 4 side of the hollow honeycomb structure 8. However, even if the on-off valve 26 is opened, the first fluid slightly flows to the cell 4 side of the hollow honeycomb structure 8, so that heat recovery may not be sufficiently suppressed.

Therefore, in the heat exchanger according to Embodiment 3 of the present invention, the on-off valve is configured to interrupt the flow of the first fluid to the cell 4 side of the hollow honeycomb structure 8 during non-heat exchange.

Figure 7A:
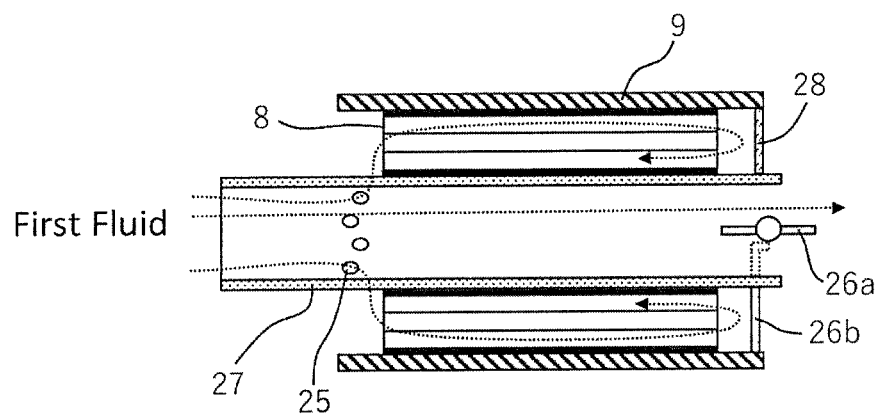
FIG. 7A is a cross-sectional view of a hollow pillar shaped honeycomb structure in a direction parallel to a flow path direction of a first fluid in a heat exchanger according to Embodiment 3 of the present invention during non-heat exchange.
Figure 7B:
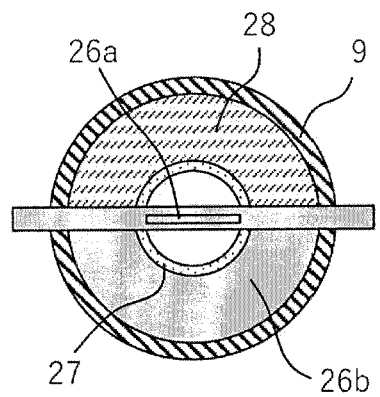
FIG. 7B is a view of a surface of a hollow pillar shaped honeycomb structure in a direction perpendicular to a flow path direction of a first fluid, as viewed from an on-off valve side.
Figure 8A:
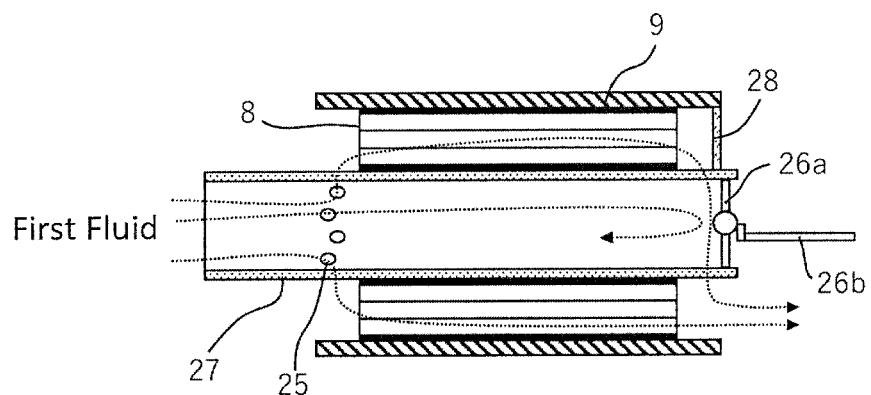
FIG. 8A is a cross-sectional view of a hollow pillar shaped honeycomb structure in a direction parallel to a flow path direction of a first fluid in a heat exchanger according to Embodiment 3 of the present invention during heat exchange.
Figure 8B:
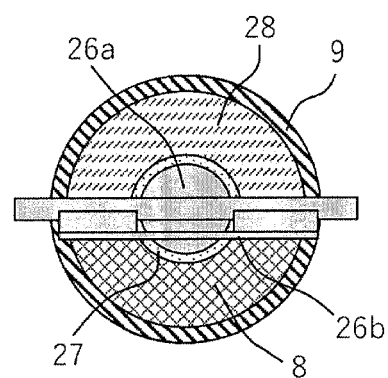
FIG. 8B is a view of a surface of a hollow pillar shaped honeycomb structure in a direction perpendicular to a flow path direction of a first fluid, as viewed from an on-off valve side.

FIGS. 7A and 8A each shows a cross-sectional view of the hollow pillar shaped honeycomb structure in the direction parallel to the flow path direction of the first fluid in the heat exchanger according to Embodiment 3 of the present invention. FIGS. 7B and 8B each shows a view of the surface of the hollow pillar shaped honeycomb structure in the direction perpendicular to the flow path direction of the first fluid, as viewed from the on-off valve side. FIGS. 7A and 7B show a state during non-heat exchange, and FIGS. 8A and 8B show a state during heat exchange.

It should be noted that, in FIGS. 7A-8B, the frame 23 is omitted from the viewpoint of making the drawings easy to see. Further, as used herein, the wording "during heat exchange" means a case where heat exchange is performed between the first fluid and the second fluid (that is, a case of performing heat recovery), and the wording "during non-heat exchange" means a case where heat exchange is not performed between the first fluid and the second fluid (that is, a case of suppressing heat recovery).

As shown in FIGS. 7A-8B, the heat exchanger according to Embodiment 3 of the present invention is provided with on-off valves 26 including: a first on-off valve 26*a* being configured to interrupt the flow of the first fluid on the inner cylinder 27 side; and a second on-off valve 26*b* being configured to interrupt the flow of the first fluid on the cell 4 side of the hollow honeycomb structure 8. The second on-off valve 26*b* is configured to be closed when the first on-off valve 26*a* is opened, and to be opened when the first on-off valve 26*a* is closed. Further, it is provided with a blocking wall 28 for the flow path for the first fluid flowing on the cell 4 side of the hollow honeycomb structure 8. Each of the second on-off valve 26*b* and the blocking wall 28 has a half donut shape (half ring shape) that can shut off the half of the flow path for the first fluid between the inner cylinder 27 and the covering member 9. When the second on-off valve 26*b* is closed, the second on-off valve 26*b* and the blocking wall 28 integrally block the flow of the first fluid.

It should be noted that although FIGS. 7A-8B each shows an example in which each of the second on-off valve 26*b* and the blocking wall 28 has the half donut shape, their shapes are not particularly limited as long as the second on-off valve 26*b* and the blocking wall 28 are configured to block the flow of the first fluid together. For example, the blocking wall 28 may have an annular fan shape having a central angle of 270°, and the second on-off valve 26*b* may have an annular fan shape having a central angle of 90°.

In the heat exchanger according to Embodiment 3 according to the present invention having the above structure, the first on-off valve 26*a* is opened and the second on-off valve 26*b* is closed during non-heat exchange, whereby the flow of the first fluid on the cell 4 side of the hollow honeycomb structure 8 is interrupted, so that the first fluid selectively flows into the inner cylinder 27 side in the hollow region 10 of the hollow honeycomb structure 8. Therefore, during non-heat exchange, the first fluid can be prevented from flowing into the cell 4 side of the hollow honeycomb structure 8, so that the suppression of heat recovery can be improved. On the other hand, during heat exchange, the first on-off valve 26*a* is closed and the second on-off valve 26*b* is opened, whereby the flow of the first fluid on the inner cylinder 27 side in the hollow region 10 of the hollow honeycomb structure 8 is interrupted, so that the first fluid selectively flows into the cell 4 side of the hollow honeycomb structure 8. Therefore, during heat exchange, the first fluid can be prevented from flowing into the inner cylinder 27 side in the hollow region 10 of the hollow honeycomb structure 8, so that heat recovery can be improved.

It should be noted that since the effect described by this embodiment is not dependent on the heat exchanging member 1 according to Embodiment 1 of the present invention, it can be also obtained by using a well-known heat exchanging member in the technical field.

Embodiment 4

A heat exchanger according to Embodiment 4 of the present invention is different from the heat exchangers according to Embodiments 2 and 3 of the present invention in that in the former, the frame and/or the covering member forming the flow path for the second fluid is/are provided with at least one turbulent flow generating portion. Hereinafter, descriptions of the same portions as those of the heat exchangers according to Embodiments 1 and 2 of the present invention will be omitted, and only different points will be described.

In the heat exchangers according to Embodiments 2 and 3 of the present invention, the heat exchange to the first fluid is performed while allowing the second fluid to pass through the flow path 24 for the second fluid. However, if the flow of the second fluid in the flow path 24 for the second fluid is smooth, the heat exchange efficiency to the first fluid may not be sufficiently enhanced.

Therefore, in the heat exchanger according to Embodiment 4 of the present invention, the frame and/or the covering member forming the flow path for the second fluid is/are provided with the turbulent flow generating portion(s).

Figure 9:
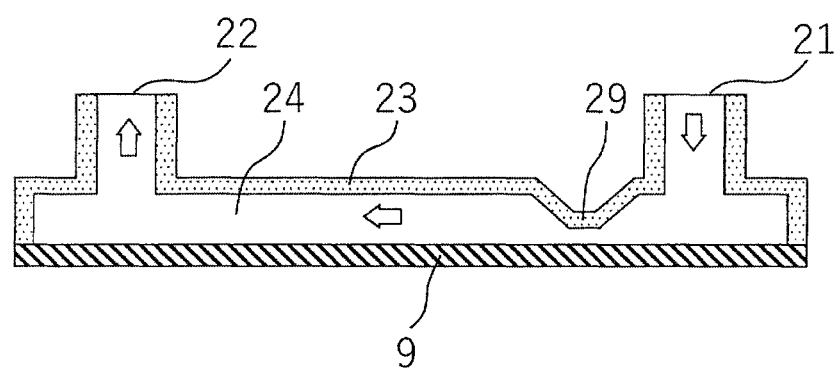
FIG. 9 is an enlarged cross-sectional view of a flow path for a second fluid in a direction parallel to a flow path direction of a first fluid of a hollow pillar shaped honeycomb structure in a heat exchanger according to Embodiment 4 of the present invention.

FIG. 9 shows an enlarged cross-sectional view of the flow path for the second fluid in the direction parallel to the flow path direction of the first fluid of the hollow pillar shaped honeycomb structure in the heat exchanger according to Embodiment 4 of the present invention. It should be noted that in FIG. 9, members other than the flow path for the second fluid are omitted from the viewpoint of making the drawing easy to see.

As shown in FIG. 9, the heat exchanger according to Embodiment 4 of the present invention includes a turbulent flow generating portion 29 formed in the flow path 24 for the second fluid. As used herein, the wording "turbulent flow generating portion 29" means a portion capable of generating turbulence in the second fluid. By providing the turbulent flow generating portion 29 in the frame 23 and/or the covering member 9 forming the flow path 24 for the second fluid, turbulence is generated in the second fluid passing through the flow path 24 for the second fluid between the covering member 9 and the frame 23, and the heat transfer coefficient between the first fluid and the second fluid is improved, so that the heat exchange efficiency can be improved.

The turbulent flow generating portion 29 is not particularly limited as long as it can generate turbulence, and it may have various shapes such as a protrusion, a recess, and a reduced diameter portion. Further, the turbulent flow generating portion 29 may be formed in the flow path 24 for the second fluid, and may be formed in either the covering member 9 or the frame 23 or in both of the covering member 9 and the frame 23. Furthermore, the number of the turbulent flow generating portions 29 is not particularly limited, and it may be appropriately adjusted according to the shape of the turbulent flow generating portion 29 and the like.

Figure 10A:
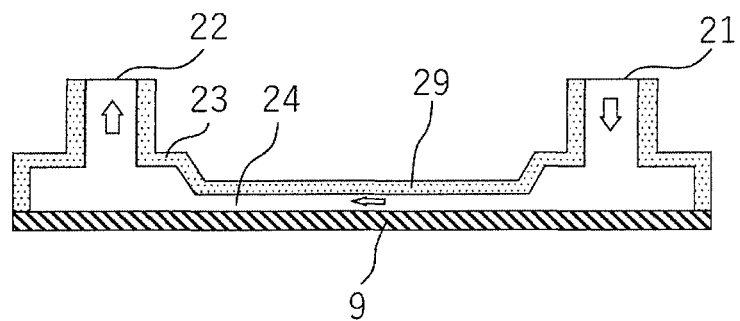
FIGS. 10A-10D are views for explaining a turbulent flow generating portion formed in a flow path for a second fluid.
Figure 10B:
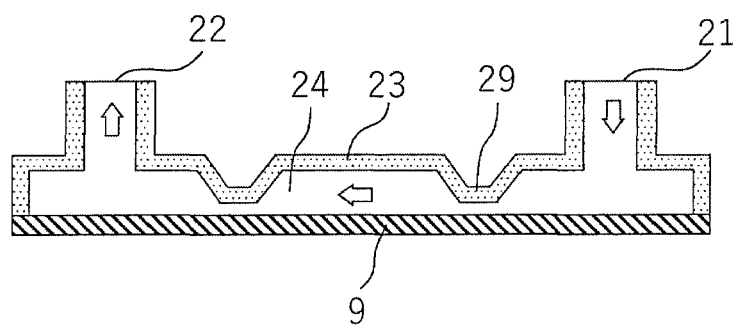
Figure 10C:
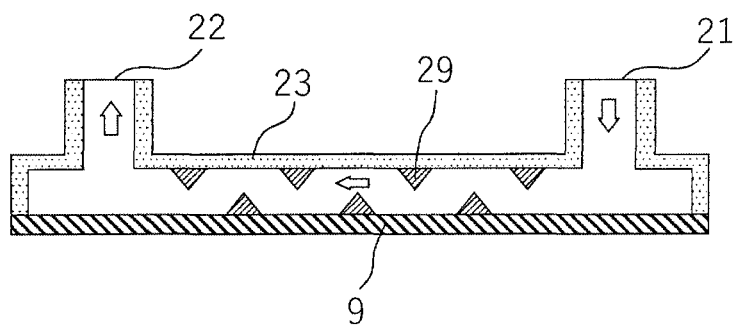
Figure 10D:
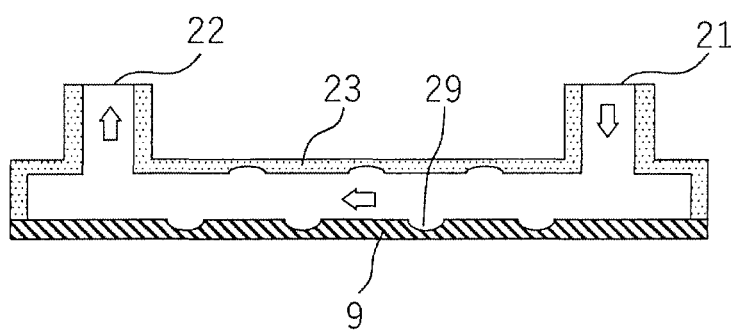

FIG. 9 shows an example in which a reduced diameter portion as the turbulent flow generating portion 29 is formed at one position of the frame 23. Further, FIG. 10A shows a reduced diameter portion as the turbulent flow generating portion 29 may be formed in most of the frame 23, FIG. 10B shows reduced diameter portions as the turbulent flow generating portions 29 may be formed at two positions of a part of the frame 23, FIG. 10C shows protrusions as the turbulent flow generating portions 29 may be provided on both of the covering member 9 and the frame 23, or FIG. 10D shows recesses as the turbulent flow generating portions 29 may be provided on both of the covering member 9 and the frame 23.

It should be noted that since the effect described by this embodiment is not dependent on the heat exchanging member 1 according to Embodiment 1 of the present invention, it can be also obtained by using a well-known heat exchanging member in the technical field.

Embodiment 5

The heat exchangers according to Embodiments 2 to 4 of the present invention can be produced according to a known method, but assembling may be difficult.

Therefore, a heat exchanger according to Embodiment 5 of the present invention is produced by dividing members into easy-to-assemble members and assembling them in an appropriate order.

FIGS. 11A-11E are cross-sectional views for explaining the method for producing the heat exchanger according to Embodiment 5 of the present invention. This cross-sectional view is a cross-sectional view of the hollow pillar shaped honeycomb structure in a direction parallel to the flow path direction of the first fluid.

Figure 11A:
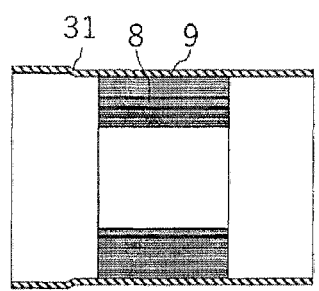
FIGS. 11A-11E are cross-sectional views for explaining a method for producing a heat exchanger according to Embodiment 5 of the present invention.

As shown in FIG. 11A, first, the heat exchanging member 1 formed of the hollow pillar shaped honeycomb structure 8 and the covering member 9 are prepared. The covering member 9 has a small diameter portion, a large diameter portion, and a step portion 31 for continuously forming the small diameter portion and the large diameter portion in the axial direction.

Figure 11B:
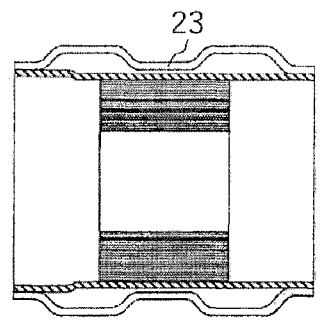

Then, as shown in FIG. 11B, the heat exchanging member 1 is inserted into the frame 23 and fixed by welding or the like. The frame 23 is set such that an inner diameter of one end side of the frame 23 in the axial direction is larger than an inner diameter of the other end side of the frame 23 in the axial direction. The inner diameter of one end side of the frame 23 in the axial direction corresponds to an outer diameter of the large diameter portion of the covering member 9, and the inner diameter of the other end side of the frame 23 in the axial direction corresponds to an outer diameter of the small diameter portion of the covering member 9. Therefore, this can allow any mistake of an insertion direction of the heat exchanging member 1 into the frame 23 to be difficult.

Figure 11D:
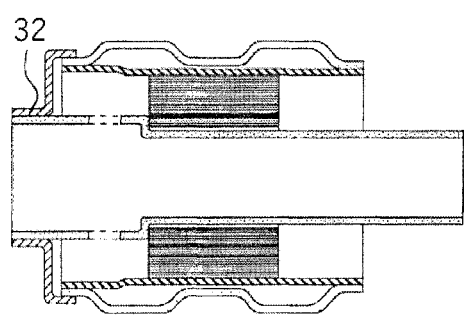
Figure 11C:
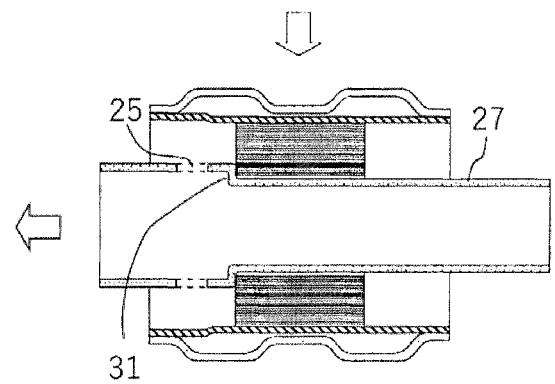

As shown in FIG. 11C, the inner cylinder 27 is then inserted into the hollow region 10 of the hollow pillar shaped honeycomb structure 8. The inner cylinder 27 has a small diameter portion, a large diameter portion, and a step portion 31 for continuously forming the small diameter portion and the large diameter portion in the axial direction. An outer diameter of the small diameter portion of the inner cylinder 27 is smaller than a diameter of the hollow region 10 of the hollow pillar shaped honeycomb structure 8, and an outer diameter of the large diameter portion of the inner cylinder 27 is larger than the diameter of the hollow region 10 of the hollow pillar shaped honeycomb structure 8. Then, the step portion 31 is engaged with one end face (the first end face 2 or the second end face 3) of the hollow pillar shaped honeycomb structure 8 to fix the inner cylinder 27, so that the position of the inner cylinder 27 is determined. Therefore, any positional deviation of the inner cylinder 27 can be difficult to occur. The step portion 31 and one end face of the pillar shaped honeycomb structure 8 may be engaged and fixed by any method, such as by bringing them into contact with each other to fix them, or fixing them to each other using a known bonding material.

Then, as shown in FIG. 11D, after providing a front cover 32 on the large diameter portion side of the inner cylinder 27, the front cover 32 is fixed to the inner cylinder 27 and the frame 23 by welding or the like. The front cover 32 has an inner diameter corresponding to the outer diameter of the large diameter portion of the inner cylinder 27 and the outer diameter of one end of the frame 23, so that any mistake of an installation position of the front cover 32 can be difficult to occur.

Figure 11E:
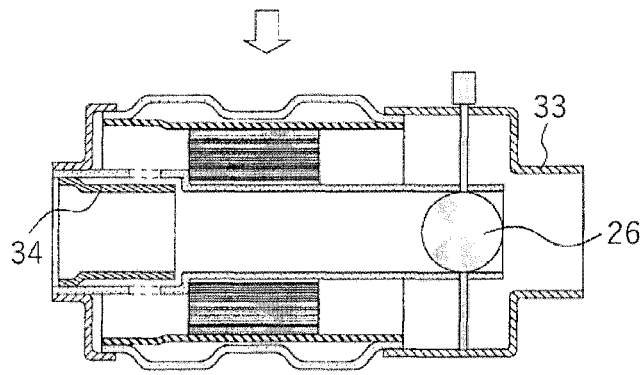

Then, as shown in FIG. 11E, after providing a back cover 33 on the other end side of the frame 23, the back cover 33 is fixed to the frame 23 by welding or the like, and the on-off valve 26 is attached. The back cover 33 has an inner diameter corresponding to the outer diameter on the other end side of the frame 23, so that any mistake of an installation position of the back cover 33 can be difficult to occur. Further, a shielding pipe 34 is inserted into the inner cylinder 27 on the large diameter side and then fixed by welding or the like.

Although the inlet 21 and the outlet 22 for the second fluid are not shown in FIGS. 11A-11E, they may be connected in advance to the frame 23 by welding or the like, or may be connected after any of the steps (B) to (E).

The heat exchanger according to Embodiment 5 of the present invention produced as described above is difficult to generate mistakes of positions, inserting positions and the like of members to be formed and is easily assembled, so that it is easy to be produced.

It should be noted that since the effect described by this embodiment is not dependent on the heat exchanging member 1 according to Embodiment 1 of the present invention, it can be also obtained by using a well-known heat exchanging member in the technical field.

Embodiment 6

A heat exchanger according to Embodiment 6 of the present invention includes the heat exchanger according to any one of Embodiments 2 to 5 of the present invention, and a purifier provided in the flow path for the first fluid on the upstream side of the heat exchanger, wherein the purifier and the heat exchanger are integrated by the frame of the heat exchanger. The configurations of the heat exchangers according to Embodiments 2 to 5 of the present invention are described above, and other configurations will be described.

The heat exchanger according to each of Embodiments 2 to 5 of the present invention is difficult to ensure the arrangement space because it is necessary to connect the heat exchanger to a purification device by piping in order to obtain a purification function.

Therefore, the heat exchanger with purifier according to Embodiment 6 of the present invention is provided with a purifier at the flow path for the first fluid on the upstream side of the heat exchanger, so that the purifier and the heat exchanger are integrated by the frame.

Figure 12:
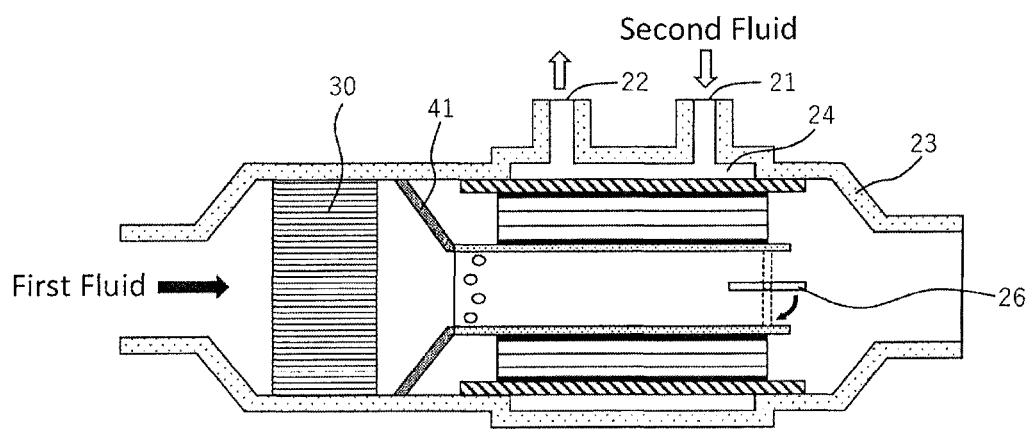
FIG. 12 is a cross-sectional view of a hollow pillar shaped honeycomb structure in a direction parallel to a flow path direction of a first fluid in a heat exchanger with purifier according to Embodiment 6 of the present invention.

FIG. 12 is a cross-sectional view of the hollow pillar shaped honeycomb structure in the direction parallel to the flow path direction of the first fluid in the heat exchanger with a purifier according to Embodiment 6 of the present invention.

As shown in FIG. 12, the heat exchanger with purifier according to Embodiment 6 of the present invention is provided with a purifier 30 in the flow path for the first fluid on the upstream side of the heat exchanger. Further, a separation wall 41 is provided between the heat exchanger and the purifier 30 such that the first fluid which has passed through the purifier 30 is introduced into the inner cylinder 27. Furthermore, the purifier 30 is integrated with the heat exchanger by the frame 23. Therefore, it is not necessary to connect the heat exchanger to the purifier 30 by piping, so that space saving can be achieved.

Figure 13:
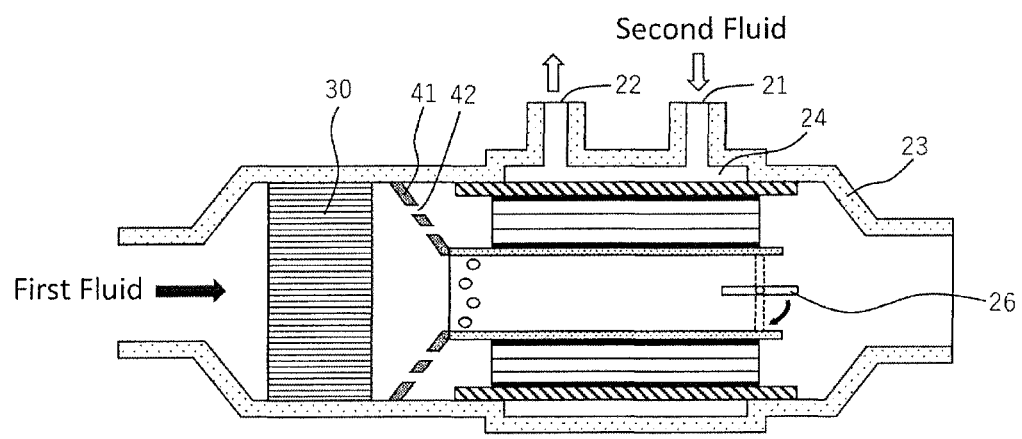
FIG. 13 is a cross-sectional view of a hollow pillar shaped honeycomb structure with purifier in a direction parallel to a flow path direction of a first fluid in a heat exchanger according to Embodiment 6 of the present invention.

The separation wall 41 may have through holes 42 as shown in FIG. 13. When the separation wall 41 has the through holes 42, the first fluid that has passed through the purifier 30 can flow into both the cells 4 and the inner cylinder 27 of the hollow honeycomb structure 8. In the heat exchanger with the purifier having such a structure, the first fluid flows in the cells 4 via both of the through holes 25 of the inner cylinder 27 and the through holes 42 of the separation wall 41 by closing the on-off valve 26 during heat exchange. At this time, in particular, the first fluid linearly flows in the cells 4 from the through holes 42 of the separation wall 41, thereby enabling ventilation resistance to be decreased. On the other hand, during non-heat exchange, the first fluid flows into the inner cylinder 27 by opening the on-off valve 26. At this time, the first fluid is to flow into the cells 4 from the through holes 42 of the separation wall 41, but the ventilation resistance of the cells 4 is much higher than that of the inner cylinder 27, so that most of the first fluid passes through the inner cylinder 27.

Figure 14:
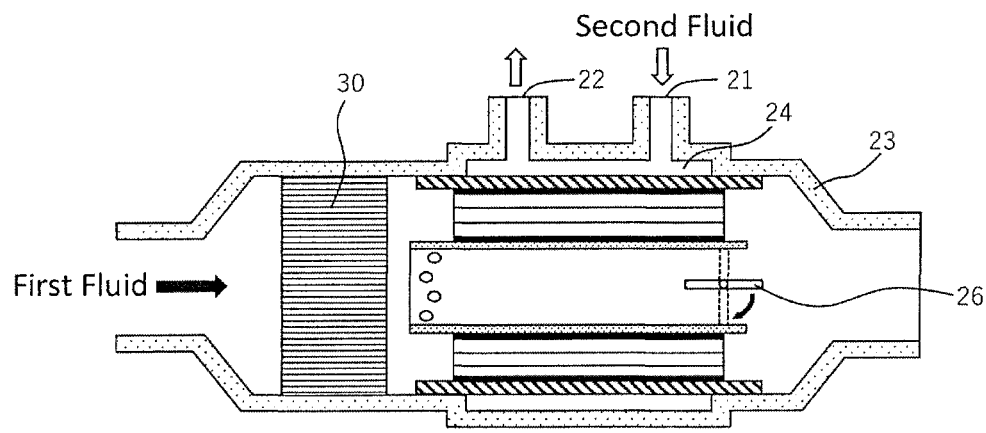
FIG. 14 is a cross-sectional view of a hollow pillar shaped honeycomb structure in a direction parallel to a flow path direction of a first fluid in a heat exchanger with purifier according to Embodiment 6 of the present invention.

Further, as shown in FIG. 14, the separation wall 41 may not be provided between the hollow pillar shaped honeycomb structure 8 provided with the inner cylinder 27 in the hollow region 10 and the purifier 30. When the separation wall 41 is not provided, the first fluid that has passed through the purifier 30 can flow into both of the cells 4 and the inner cylinder 27 of the hollow honeycomb structure 8. In the heat exchanger with purifier having such a structure, the on-off valve 26 is closed during heat exchange, whereby the first fluid that has passed through the purifier 30 directly flows into the cells 4 or it flows into the cells 4 through the through holes 25 of the inner cylinder 27. At this time, in particular, the first fluid that has passed through the purifier 30 directly and linearly flows in the cells 4, so that the ventilation resistance can be reduced. On the other hand, during non-heat exchange, the first fluid flows into the inner cylinder 27 by opening the on-off valve 26. At this time, the first fluid that has passed through the purifier 30 is to flow into the cells 4, but the ventilation resistance of the cells 4 is much higher than that of the inner cylinder 27, so that most of the first fluid passes through the inside of the inner cylinder 27.

The purifier 30 is not particularly limited, and any means known in the art may be used. Examples of the purifier 30 include a catalyst body in which a catalyst is supported, a filter and the like. For example, when an exhaust gas is used as the first fluid, the catalyst that can be used includes a catalyst having a function of oxidizing or reducing the exhaust gas. The catalyst includes noble metals (for example, platinum, rhodium, palladium, ruthenium, indium, silver, gold and the like), aluminum, nickel, zirconium, titanium, cerium, cobalt, manganese, zinc, copper, tin, iron, niobium, magnesium, lanthanum, samarium, bismuth, barium and the like. These elements may be elemental metals, metal oxides, and other metal compounds. Moreover, these catalysts may be used alone or in combination of two or more.

It should be noted that since the effect described by this embodiment is not dependent on the heat exchanging member 1 according to Embodiment 1 of the present invention, it can be also obtained by using a well-known heat exchanging member in the technical field.

Embodiment 7

A heat exchanger with purifier according to Embodiment 7 of the present invention is different from the heat exchanger with purifier according to Embodiment 6 of the present invention in that the former provides a purifier 30 in the flow path for the first fluid on the downstream side of the heat exchanger. Hereinafter, the descriptions of the same portions as those of the heat exchanger with purifier according to Embodiment 6 of the present invention will be omitted, and only different points will be described.

In the heat exchanger with purifier according to Embodiment 6 of the present invention, when the first fluid having an elevated temperature passes through the purifier 30, the temperature of the first fluid may be decreased, so that the heat recovery efficiency may be decreased.

Therefore, in the heat exchanger with purifier according to Embodiment 7 of the present invention, the purifier 30 is provided in the flow path for the first fluid on the downstream side of the heat exchanger, and the purifier 30 and the heat exchanger are integrated.

Figure 15:
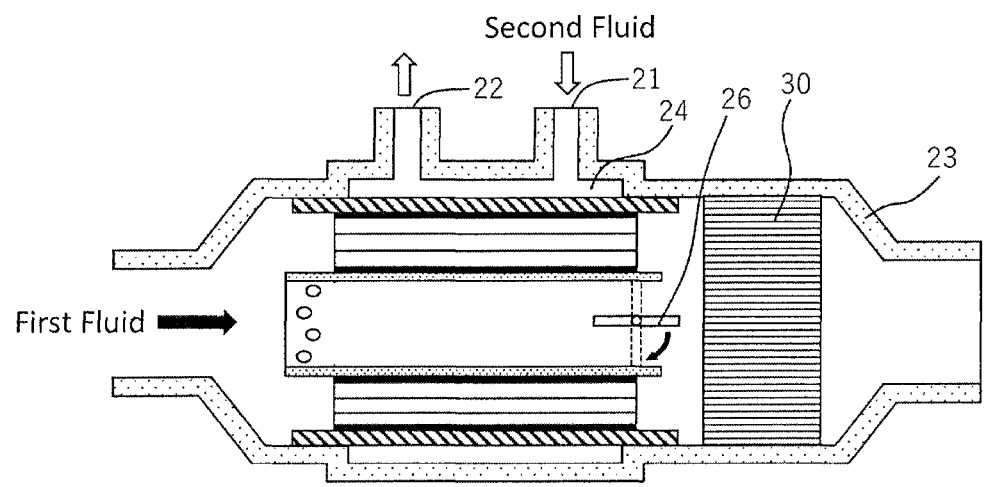
FIG. 15 is a cross-sectional view of a hollow pillar shaped honeycomb structure in a direction parallel to a flow path direction of a first fluid in the heat exchanger with purifier according to Embodiment 7 of the present invention.

FIG. 15 shows a cross-sectional view of the hollow pillar shape honeycomb structure in a direction parallel to the flow path direction of the first fluid in the heat exchanger with purifier according to Embodiment 7 of the present invention.

As shown in FIG. 15, the heat exchanger with purifier according to Embodiment 7 of the present invention is provided with a purifier 30 in the flow path for the first fluid on the downstream side of the heat exchanger. Therefore, the heat recovery efficiency can be enhanced while ensuring purification performance. Further, the purifier 30 is integrated with the heat exchanger by the frame 23. Therefore, it is not necessary to connect the heat exchanger to the purifier 30 by piping, so that space saving can be achieved.

Embodiment 8

A heat exchanger with purifier according to Embodiment 8 of the present invention is different from the heat exchanger with purifier according to each of Embodiments 6 and 7 in that the former provides purifiers 30 in the flow path for the first fluid on both of the upstream side and the downstream side of the heat exchanger. Hereinafter, the descriptions of the same portions as those of the heat exchangers with purifier according to Embodiments 6 and 7 of the present invention will be omitted, and only different points will be described.

When the purifier 30 is provided at the flow path for the first fluid on the upstream side of the heat exchanger, the temperature of the first fluid is decreased when the first fluid having an elevated temperature passes through the purifier 30, so that the heat recovery efficiency may be decreased. On the other hand, when the purifier 30 is provided at the flow path for the first fluid on the downstream side of the heat exchanger, the temperature of the first fluid is decreased due to heat recovery by the heat exchanger, so that sufficient heat to ensure catalysis of the purifier 30 cannot be obtained and the purification performance may be deteriorated.

Therefore, the heat exchanger with purifier according to Embodiment 8 of the present invention divides the purifier 30 and provides the purifiers 30 in the flow path for the first fluid on both of the upstream and downstream sides of the heat exchanger. The purifiers 30 and the heat exchanger are integrated by the frame 23.

Figure 16:
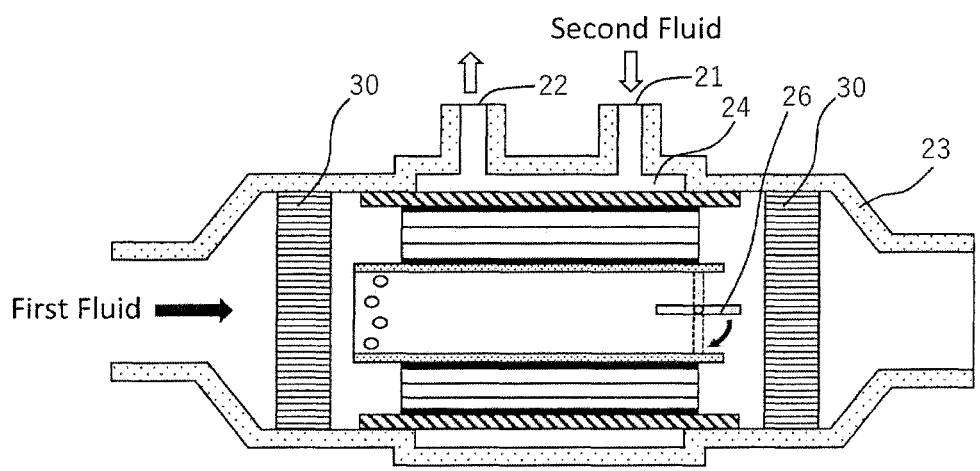
FIG. 16 is a cross-sectional view of a hollow pillar shaped honeycomb structure in a direction parallel to a flow path direction of a first fluid in a heat exchanger with purifier according to Embodiment 8 of the present invention.

FIG. 16 is a cross-sectional view of the hollow pillar shaped honeycomb structure in a direction parallel to the flow path direction of the first fluid in the heat exchanger with purifier according to Embodiment 8 of the present invention.

As shown in FIG. 16, the heat exchanger with purifier according to Embodiment 8 of the present invention is provided with two divided purifiers 30 in the flow path for the first fluid on the upstream side and the downstream side of the heat exchanger. Therefore, both of the purification performance and the heat recovery efficiency can be enhanced. Further, the purifiers 30 are integrated with the heat exchanger by the frame 23. Therefore, it is not necessary to connect the heat exchanger to the purifiers 30 by piping, so that space saving can be achieved.

Embodiment 9

A heat exchanger with purifier according to Embodiment 9 of the present invention is different from the heat exchanger with purifier according to each of Embodiments 6 and 7 of the present invention in that the former includes two or more heat exchangers and a purifier provided in the flow path for the first fluid between the heat exchangers, wherein at least one of the heat exchangers is the heat exchanger according to any one of Embodiments 2 to 5 of the present invention. Hereinafter, the descriptions of the same portions as those of the heat exchangers with purifier according to Embodiments 6 to 8 of the present invention will be omitted, and only different points will be described.

Figure 17:
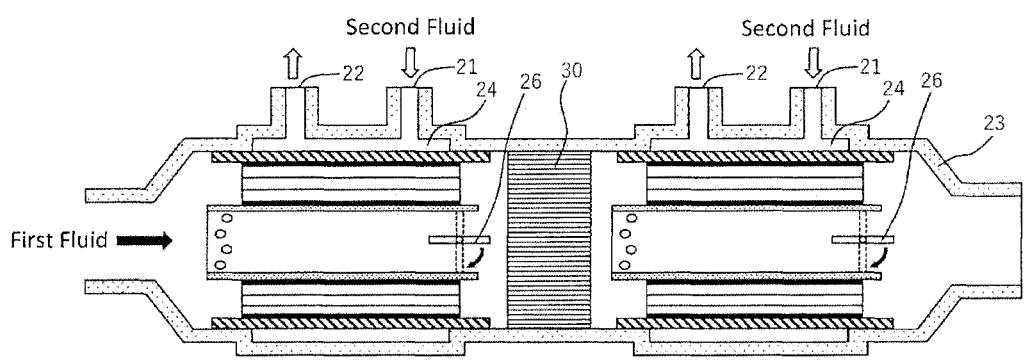
FIG. 17 is a cross-sectional view of a hollow pillar shaped honeycomb structure in a direction parallel to a flow path direction of a first fluid in a heat exchanger with purifier according to Embodiment 9 of the present invention.

FIG. 17 is a cross-sectional view of the hollow pillar shaped honeycomb structure in a direction parallel to the flow path direction of the first fluid in the heat exchanger with purifier according to Embodiment 9 of the present invention.

As shown in FIG. 17, the heat exchanger with purifier according to Embodiment 9 of the present invention includes two heat exchangers according to Embodiments 2 to 5 of the present invention, and a purifier 30 provided in the flow path for the first fluid between the two heat exchangers. With such a configuration, the number of heat exchangers can be increased, so that an amount of heat recovery can be increased. Although FIG. 17 shows an example in which the upstream side and the downstream side of the flow path for the first fluid are provided with one heat exchanger, respectively, the upstream side and the downstream side of the flow path for the first fluid may be provided with two or more heat exchangers, respectively.

Figure 18:
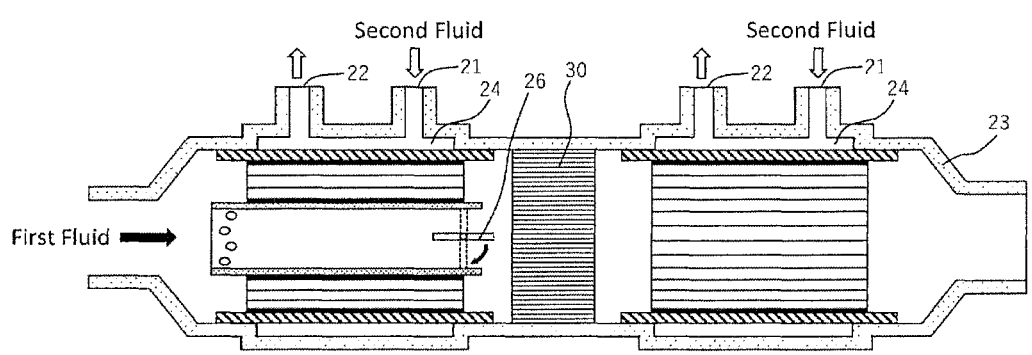
FIG. 18 is a cross-sectional view of hollow and solid pillar shaped honeycomb structures in a direction parallel to a flow path direction of a first fluid in other heat exchanger with purifier according to Embodiment 9 of the present invention.
Figure 19:
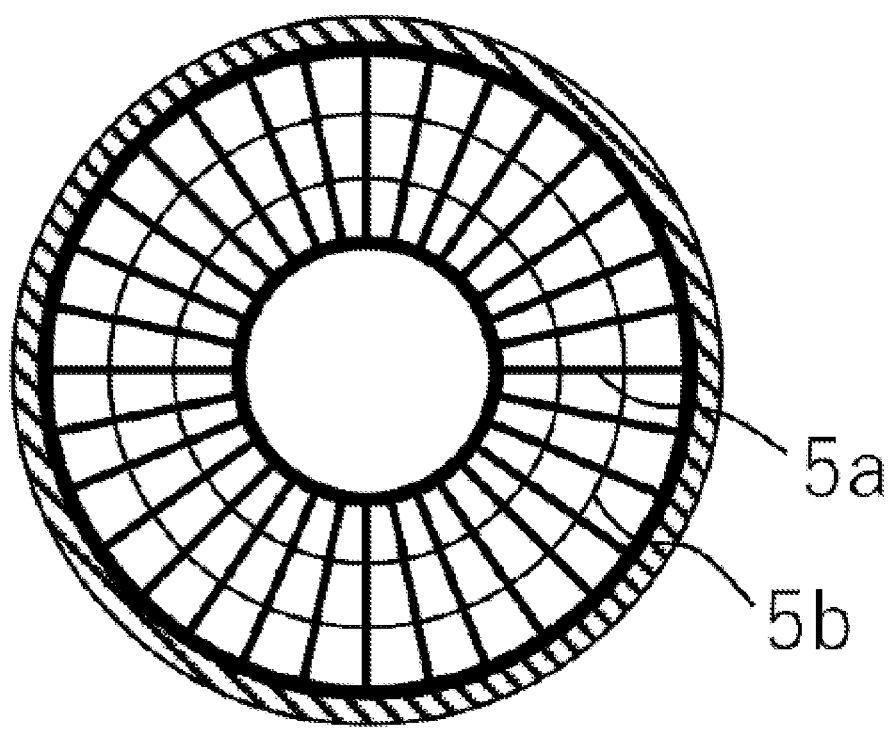
FIG. 19 is cross-sectional view of a hollow pillar shaped honeycomb structure in a direction perpendicular to a flow path direction of a first fluid in a heat exchanging member according to the present invention.

Further, as shown in FIG. 18, the heat exchangers according to Embodiments 2 to 5 of the present invention may be used in combination with heat exchangers having different mechanisms from those heat exchangers. FIG. 18 shows an example of using, as the heat exchanger having different mechanisms from the heat exchangers according to the Embodiments 2 to 5 of the present invention, a heat exchanger including: a solid pillar shaped honeycomb structure having partition walls that define cells, the cells penetrating from a first end face to a second end face to form flow paths for a first fluid, and an outer peripheral wall; and a covering member being configured to cover the outer peripheral wall of the sold pillar shaped honeycomb structure, wherein the heat exchanger includes a heat exchanging member being configured to perform heat exchange between the first fluid and a second fluid flowing through the outside of the covering member. This heat exchanger has the same configuration as the heat exchangers according to Embodiments 2 to 5 of the present invention, with the exception that the solid columnar honeycomb structure is used in place of the hollow columnar honeycomb structure. The heat exchanger having different mechanisms from those of the heat exchangers according to Embodiments 2 to 5 is not limited to the above example, and other heat exchangers having mechanisms known in the art may be used. Further, FIG. 18 shows an example in which the heat exchanger according to Embodiments 2 to 5 of the present invention is provided on the upstream side of the flow path for the first fluid, but the heat exchanger according to Embodiments 2 to 5 of the present invention may be provided on the downstream side of the flow path for the first fluid. Furthermore, FIG. 18 shows an example in which the upstream side and the downstream side of the flow path for the first fluid are provided with one heat exchanger, respectively, but the upstream side and the downstream side of the flow path for the first fluid may be provided with two or more heat exchangers, respectively. With such a configuration, an amount of heat recovery can be increased and a risk of simultaneous failure of two or more heat exchangers can be reduced, leading to improved reliability.

EXAMPLES

Hereinafter, the present invention will be more specifically described with reference to Examples, but the present invention is not limited to these Examples.

Production of Honeycomb Structure

Example 1

A green body containing SiC powder was extrusion-molded into a desired shape, dried, processed to have predetermined external dimensions, and impregnated with Si and fired to produce a hollow pillar shaped honeycomb structure. The hollow pillar shaped honeycomb structure had a circular pillar-like outer shape as shown in FIGS. 1 and 2, an outer diameter of 70 mm, a diameter of the hollow region of 52 mm and a length in the flow path direction of the first fluid of 25 mm. Further, each of the first partition walls, the second partition walls, the inner peripheral wall and the outer peripheral wall had the thickness as shown in Table 1.

Comparative Examples 1 and 2

Each hollow pillar shaped honeycomb structure was produced in the same method as that of Example 1, with the exception that the thicknesses of the inner peripheral wall and the outer peripheral wall were changed as shown in Table 1.

Isostatic Strength Test

A urethane rubber sheet having a thickness of 0.5 mm was wound around the outer peripheral surface of each hollow pillar shaped honeycomb structure, and aluminum disks each having a thickness of 20 mm were further disposed on both end portions of each hollow pillar shaped honeycomb structure while interposing circular urethane rubber sheets between both end portions and the aluminum disks. The aluminum disks and urethane rubber sheets used had the same shape and the same size as those of the end portions of each hollow pillar shaped honeycomb structure. Further, a vinyl tape was wound along the outer periphery of each aluminum disk, whereby a space between the outer periphery of each aluminum disk and each urethane rubber sheet was sealed to obtain a test sample. The test sample was then placed in a pressure vessel filled with water. A water pressure in the pressure vessel was then increased to 200 MPa at a rate of from 0.3 to 3.0 MPa/min, and the water pressure at the time when each hollow pillar shaped honeycomb structure was broken was measured. In the evaluation results, a case where breakage did not occur even at a water pressure of 200 MPa is expressed as "≥200 (MPa)". The test results are shown in Table 1.

TABLE 1

| | Thickness (mm) | | | | |
|---|---|---|---|---|---|
| | Inner Peripheral Wall | Outer Peripheral Wall | First Partition Wall | Second Partition Wall | Isostatic Strength (Mpa) |
| Example 1 | 1.5 | 1.5 | 0.3 | 0.3 | ≥200 |
| Comparative Example 1 | 0.3 | 0.3 | 0.3 | 0.3 | 90 |
| Comparative Example 2 | 0.1 | 0.1 | 0.3 | 0.3 | 60 |

As shown in Table 1, the hollow pillar shaped honeycomb structure of Example 1 in which the thicknesses of the inner peripheral wall and the outer peripheral wall were larger than the thickness of the partition walls (the first partition wall and the second partition wall) had the higher isostatic strength as compared with the hollow pillar shaped honeycomb structure of Comparative Example 1 in which the thicknesses of the inner peripheral wall and the outer peripheral wall were the same as those of the partition walls, and the hollow pillar shaped honeycomb structure of Comparative Example 2 in which the thicknesses of the inner peripheral wall and the outer peripheral wall were smaller than those of the partition walls.

As can be seen from the above results, the present invention can provide a heat exchanging member, a heat exchanger and a heat exchanger with purifier, which have improved resistance against the external impact, thermal stress and the like.

DESCRIPTION OF REFERENCE NUMERALS 1 heat exchanging member
2 first end face
3 second end face
4 cell
5 partition wall
5a first partition wall
5b second partition wall
6 inner peripheral wall
7 outer peripheral wall
8 hollow pillar shaped honeycomb structure
9 covering member
10 hollow region
20 heat exchanger
21 inlet for second fluid
22 outlet for second fluid
23 frame
24 flow path for second fluid
25 through hole
26 on-off valve
26a first on-off valve
26b second on-off valve
27 inner cylinder
28 blocking wall
29 turbulent flow generating portion
30 purifier
31 step portion
32 front cover
33 back cover
34 shielding pipe
41 separation wall
42 through hole

What is claimed:
1. A heat exchanger comprising:
a heat exchanging member including a hollow pillar shaped honeycomb structure having
partition walls defining cells, the cells penetrating from a first end face to a second end face to form flow paths for a first fluid,
an inner peripheral wall, and
an outer peripheral wall having an inner peripheral surface and an outer peripheral surface, at least a portion of the cells contacting the inner peripheral surface of the outer peripheral wall;
a covering member having an inner surface contacting and covering the outer peripheral surface of the outer peripheral wall of the pillar shaped honeycomb structure;
an inner cylinder provided in a hollow region of the hollow pillar shaped honeycomb structure, the inner cylinder having through holes for introducing the first fluid into the cells of the hollow honeycomb structure;
a frame configured to form a flow path for the second fluid, the flow path being defined between the frame and the covering member; and
an on-off valve being configured to interrupt a flow of the first fluid on an inner side of the inner cylinder during heat exchange between the first fluid and the second fluid,
wherein the inner cylinder comprises
a small diameter portion,
a large diameter portion, and
a step portion for continuously forming the small diameter portion and
the large diameter portion in an axial direction,
wherein the small diameter portion has an outer diameter that is smaller than a diameter of the hollow region of the hollow pillar shaped honeycomb structure,
wherein the large diameter portion has an outer diameter that is larger than the diameter of the hollow region of the hollow pillar shaped honeycomb structure,
wherein the step portion is engaged with one end face of the hollow pillar shaped honeycomb structure to fix the inner cylinder,
wherein the heat exchanging member is configured to perform heat exchange between the first fluid and a second fluid flowing past the outer surface of the covering member,
wherein in a cross section of the pillar shaped honeycomb structure perpendicular to a flow path direction of the first fluid, the cells are radially provided,
wherein in the cross section of the pillar shaped honeycomb structure perpendicular to the flow path direction of the first fluid, the partition walls comprise
second partition walls extending in a circumferential direction, and
first partition walls crossing with the second partition walls,
wherein a length of all of the first partition walls defining one cell is longer than that of the second partition walls defining the one cell,
wherein the first and second partition walls each have a thickness in a range of 0.1 to 0.6 mm,
wherein each of the inner peripheral wall and the outer peripheral wall has a thickness larger than that of each of the partition walls, and
wherein the inner peripheral wall and the outer peripheral wall each have a thickness in a range of 1 to 10 mm.

2. The heat exchanger according to claim 1, wherein the first partition walls extend in the radial direction.

3. The heat exchanger according to claim 1, wherein each of the first partition walls has a thickness higher than that of each of the second partition walls.

4. The heat exchanger according to claim 1, wherein in the cross section of the pillar shaped honeycomb structure perpendicular to the flow path direction of the first fluid, a number of the first partition walls on the inner peripheral wall side is less than that of the first partition walls on the outer peripheral wall side.

5. The heat exchanger according to claim 1, wherein the on-off valve is configured to interrupt the flow of the first fluid on the cell side of the hollow honeycomb structure during non-heat exchange.

6. The heat exchanger according to claim 1, wherein the on-off valve comprises:
a first on-off valve being configured to interrupt the flow of the first fluid on the inner cylinder side during heat exchange; and
a second on-off valve being configured to interrupt the flow of the first fluid on the cell side of the hollow honeycomb structure during non-heat exchange.

7. The heat exchanger according to claim 6, wherein the heat exchanger further comprises a blocking wall which blocks a part of the flow of the first fluid on the cell side of the hollow honeycomb structure, and wherein the heat exchanger is configured such that the blocking wall and the second on-off valve integrally interrupt the flow of the first fluid during non-heat exchange.

8. The heat exchanger according to claim 1, wherein the frame and/or the covering member forming the flow path for the second fluid comprise at least one turbulent flow generating portion.

9. A heat exchanger with at least one purifier, comprising:
the heat exchanger according to claim 1; and
at least one purifier provided in the flow path for the first fluid on an upstream side and/or a downstream side of the heat exchanger,
wherein the at least one purifier and the heat exchanger are integrated by the frame of the heat exchanger.

10. A heat exchanger with at least one purifier, comprising:
two or more heat exchangers; and
at least one purifier provided in the flow path for the first fluid between the heat exchangers,
wherein the at least one purifier and the heat exchangers are integrated by the frame of the heat exchanger, and
wherein at least one of the two or more heat exchangers is the heat exchanger according to claim 1.

11. The heat exchanger according to claim 1, wherein the heat exchanging member comprises at least one of the following characteristics:
(a) the inner peripheral wall and the outer peripheral wall have a thickness of more than 0.3 mm and 10 mm or less;
(b) the partition walls, the inner peripheral wall and the outer peripheral wall contain 50% by mass or more of SiC;
(c) the pillar shaped honeycomb structure has an isostatic strength of more than 100 MPa; and
(d) the pillar shaped honeycomb structure has a thermal conductivity of 50 W/(m·K) or more at 25° C.

* * * * *